United States Patent [19]

Krakow et al.

[11] 3,708,227
[45] Jan. 2, 1973

[54] SPECTRAL ANALYSIS INSTRUMENT WITH PROGRAMMED SPECTRAL SLIT WIDTH

[75] Inventors: Burton Krakow, Brooklyn; Stanley A. Dolin, Rosyln Heights; Herman A. Kruegle, Little Neck, all of N.Y.

[73] Assignee: Optical Coating Laboratory, Inc., Santa Rosa, Calif.

[22] Filed: April 19, 1971

[21] Appl. No.: 135,499

Related U.S. Application Data

[63] Continuation of Ser. No. 779,947, Nov. 29, 1968, abandoned.

[52] U.S. Cl. ...................356/83, 350/271, 356/96, 356/100
[51] Int. Cl. ..........................G01j 3/42, G01j 3/12
[58] Field of Search .........356/74, 101; 350/266, 271

[56] References Cited

UNITED STATES PATENTS

| | | |
|---|---|---|
| 2,324,270 | 7/1943 | Schlesman..........................356/83 |
| 3,011,391 | 12/1961 | Fastie....................................356/99 |
| 3,460,892 | 8/1969 | Dolin....................................356/83 |

*Primary Examiner*—Ronald L. Wibert
*Assistant Examiner*—V. P. McGraw
*Attorney*—Flehr, Hohbach, Test, Albritton & Herbert

[57] ABSTRACT

A monochromator having a corner mirror scanning wheel and a fixed baffle adjacent the scanning wheel to vary the effective height of an exit slit. The height profile of the baffle is adapted to selectively vary the radiant energy passed through this exit slit at different wavelengths so as to provide the desired balance among resolution, signal-to-noise ratio and the dynamic range of the background signal over the scanned portion of the spectrum.

7 Claims, 11 Drawing Figures

INVENTORS
BURTON KRAKOW
STANLEY A. DOLIN
HERMAN A. KRUEGLE
BY Yount, Flynn & Tarolli
ATTORNEYS

INVENTORS
BURTON KRAKOW
STANLEY A. DOLIN
HERMAN A. KRUEGLE

ATTORNEYS

SPECTRAL ANALYSIS INSTRUMENT WITH PROGRAMMED SPECTRAL SLIT WIDTH

This application is a continuation of Ser. No. 779,947, filed Nov. 29, 1968, and now abandoned.

This invention relates to a spectral analysis instrument for scanning transient radiation over a selected portion of the radiation spectrum, which may fall within the infra-red, visible or ultra violet regions.

In the conventional spectrograph a photographic plate is placed in the focal plane, and the plate records the intensities of the radiation at different wavelengths within the range of the instrument. The use of a photographic plate is undesirable for certain reasons and to avoid its use it has been proposed heretofore to put one or more exit slits in the focal plane, thus permitting radiation of only one wavelength at a time to leave through a corresponding exit slit. When used in this manner, the instrument is referred to as a monochromator. Various arrangements in the instrument have also been proposed for scanning a selected portion of the radiation spectrum so that the wavelength passed by each exit slit changes in accordance with the scan. For example, the diffraction grating may be oscillated back and forth or a corner mirror scanning wheel may be provided as disclosed and claimed in the copending U.S. Pat. application of Stanley A. Dolin, Ser. No. 553,405, filed May 27, 1966, now U.S. Pat. No. 3,460,892 and assigned to the same assignee as the present invention.

In the use of monochromators the optimum slit width tends to vary appreciably with wavelength because of variations with wavelength of source radiance, grating dispersion, mirror reflectance, and detector sensitivity. Fixed size slits can only be optimized at one wavelength. Programmed slits are needed for scanning of a broad spectral region, in order to maintain a good balance between signal level and resolution and to keep the dynamic range of the background signal within reasonable limits.

Slit programming of spectrometers have been achieved heretofore by mechanically altering the separation of movable slit jaws. However, when scanning is done very rapidly, moving the slit jaws with adequate speed and precision becomes excessively difficult.

The present invention is directed to a novel arrangement for achieving slit programming in a spectral analysis instrument by means of a motionless baffle arrangement which can be mechanically set before repetitive scanning to obtain a desired balance between resolution and energy as a function of wavelength by varying with wavelength the effective height of the slit used, which itself preferably is contoured to give different slit widths as a function of height.

Accordingly, it is a principal object of this invention to provide in a spectral analysis instrument a novel and improved slit programming arrangement which does not require the use of parts which move during scanning.

Another object of this invention is to provide in a spectral analysis instrument a novel and improved slit programming arrangement having a fixedly-positioned baffle for selectively varying the effective slit area as a function of wavelength.

Further objects and advantages of this invention will be apparent from the following detailed description of two presently-preferred embodiments thereof, with reference to the accompanying drawings in which.

FIG. 1 INSTRUMENT

Figure 1:
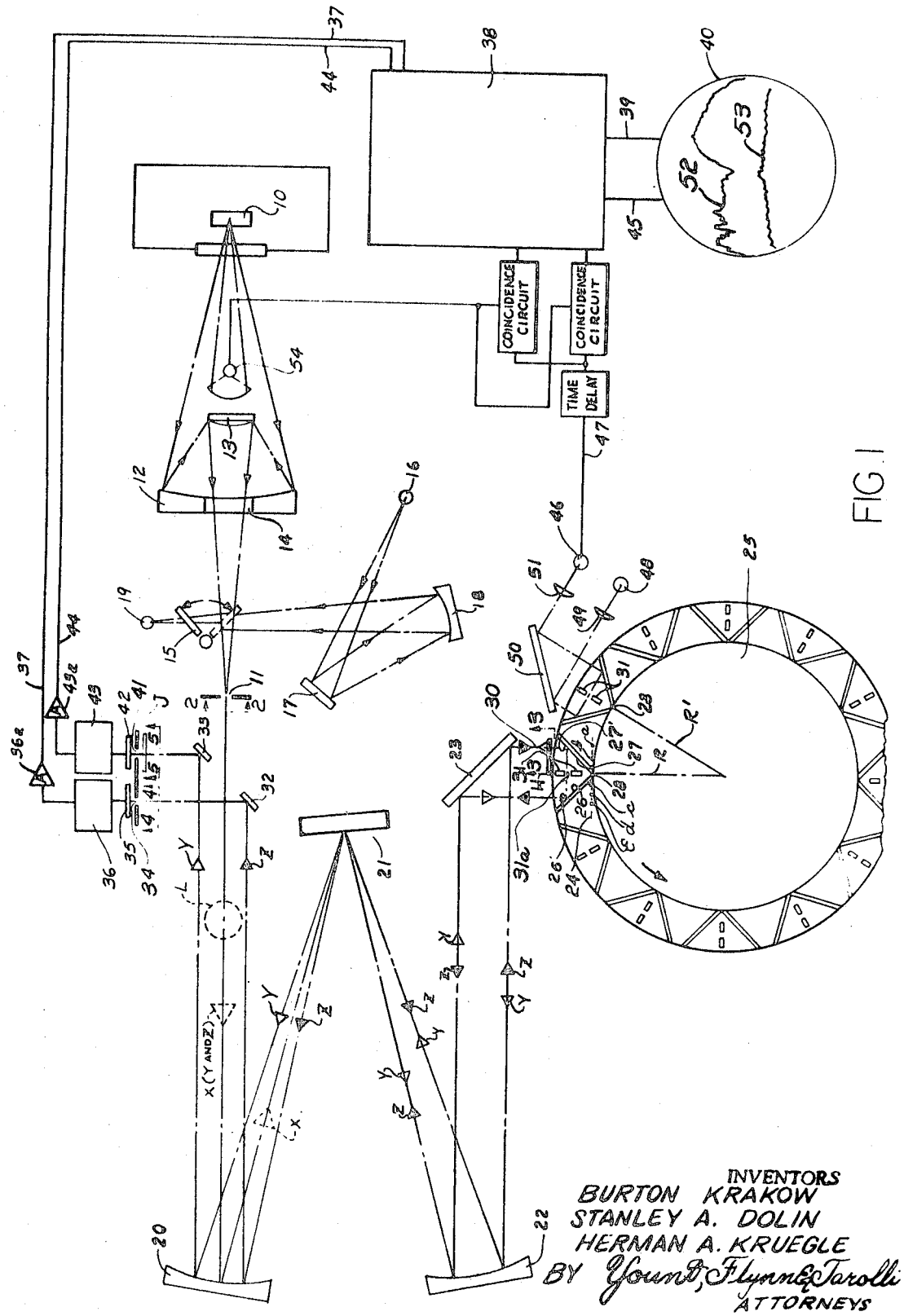
FIG. 1 illustrates schematically a spectral analysis instrument embodying the present slit programming arrangement.

Referring to FIG. 1, the spectral analysis instrument illustrated there is, in general, of the type described and claimed in U.S. patent application of Stanley A. Dolin, Ser. No. 553,405, filed May 27, 1966 now U.S. Pat. No. 3,460,892 and assigned to the same assignee as the present invention. While the present slit programming arrangement preferably is embodied in this instrument, it is to be understood that it may advantageously be embodied in other types of spectral analysis instruments, also.

The FIG. 1 instrument includes a Cassegrainian optical system for collecting infra-red radiant energy emitted by a sample 10 and for imaging the collected energy on the entrance slit 11 of a grating monochromator. The Cassegrainian collector includes a primary condenser mirror 12 presenting a spherical reflecting surface which is concave toward the sample 10 and a secondary condenser mirror 13 disposed between the sample and the primary mirror to receive the radiant energy reflected from the primary mirror. The secondary mirror presents a spherical reflecting surface which is convex toward the primary mirror. After reflection by the primary mirror, the radiant energy is reflected by the secondary mirror 13 through a central opening 14 in the primary mirror and is focused on the entrance slit 11. Focusing is accomplished by moving the primary mirror 12.

The radiation source 10 may be, for example, an infra-red radiation source which directs energy through a zone in which a solid propellant is burned so that the radiation to the instrument is the radiation from the source as modified by absorption or addition of energy from the vaporized sample. Radiation directly from the source may also be applied to the mirror 12 in a known manner alternatively with that from the vaporized zone to provide reference radiation.

For calibration purposes a double plane mirror 15, having both of its opposite major faces aluminized, is pivotally supported between the primary mirror 12 and the entrance slit 11 of the grating monochromator. In its full line position in FIG. 1, this mirror 15 permits the radiant energy from the source 10 to be imaged on the entrance slit, as described. When the mirror is moved to its phantom line position in FIG. 1, one face of mirror 15 images the radiant energy from a standard source 16 on the entrance slit 11. The radiant energy from this standard source is reflected by a plane mirror 17 to the concave surface of a mirror 18 and from there to mirror 15. The radiation energy from the standard source may be held constant by using a radiation sensor as part of a controlled loop servo system, or by any other suitable control arrangement (not shown).

In this phantom line position of mirror 15, its opposite major face reflects light from an alignment lamp 19, which is optically conjugate to the entrance slit 11, back through the Cassegrainian optical system for alignment purposes. A visible image of the alignment lamp 19 is obtained in the focal plane of the sample area with no parallax error. If desired, this alignment lamp may be omitted or it may be replaced by a removable ground glass lamp L placed behind the slit 11 to illuminate the full $f$ number of the optical system and thus project an image into space at the radiation source 10.

The radiant energy from the sample 10, after passing through the entrance slit 11 of the grating monochromator is a diverging beam which is collimated by a first collimator mirror 20, which presents a reflecting surface that is concave to the incoming radiant energy. The radiant energy reflected by the collimating mirror 20 is comprised of substantially parallel rays which strike a light-dispersing element, preferably a diffraction grating 21, which disperses the radiation into component wavelengths.

The diffracted radiant energy is made up of collimated beams of monochromatic energy and the beams defined different angles with the grating depending on wavelength to form a diverging bundle of beams which strikes a second collimator mirror 22, which presents a concave surface to the diffracted radiant energy. The diffracted radiant energy is reflected by mirror 22 to provide beams of converging radiation with the centerlines of the beams of different spectral components parallel and spaced apart perpendicular to its path.

A plane mirror 23 presents a reflecting surface disposed at 45° to the path of the bundle of beams from the mirror 22 and folds these beams toward a focal plane for the converging beams designated by the line 24 in FIG. 1. The different spectral components of the refracted radiant energy will have a focus along this focal plane at different locations indicated by the letters $a$, $b$, $c$, $d$, etc. For example, the shortest wavelength component appears at the right of this plane and the progressively longer wavelengths at positions successively to the left, as viewed in FIG. 1.

A rotatable scanning wheel 25 carries a plurality of sets of corner mirrors, each consisting of a pair of confronting mirror members 26 and 27, for scanning the diffracted radiant energy spectrum from the mirror 23 and sequentially redirecting the spectral beams in a return pass through the instrument. The confronting mirror members 26, 27 of each corner mirror set are disposed perpendicular to each other and diverge away from each other toward the periphery of the wheel at opposite 45° angles to a radius R of the wheel passing through their corner intersection 28. In such a corner mirror arrangement an incident beam striking the mirror 26 is reflected across to the mirror 27 and from the mirror 27 along a path parallel to but offset from the original path of the beam to the mirror 26. For example, a beam from the reflecting mirror 23 striking mirror 26 at the portion 26' will be directed by the mirror 26 to the portion 27' of the mirror 27 and reflected along a path parallel to but offset from the path of the incident beam from mirror 23.

Conversely, a parallel beam striking the mirror 27 at its portion 27' will be reflected to the portion 26' of the mirror 26 and returned along a path parallel to, but offset from, the path of the incident beam from mirror 23.

The corner-mirror scanning wheel 25 is mounted for rotation generally tangent to the focal plane 24. Assuming counterclockwise rotation in FIG. 1, first the mirror member 26 moves across the focal plane 24 from right to left, and then the opposite mirror member 27 of the same pair moves across the focal plane 24 from right to left.

As the wheel rotates, the sets of corner mirrors will be moved through the focused beams from the mirror 23 to cause the beams of radiation from the corner mirrors to sequentially strike the portions 26', 27' of the corner mirrors. When the mirror 26 or 27 receives incident radiation from the mirror 23 and reflects it to the other mirror and back to the mirror 23, the beam will be redirected through the instrument along a predetermined return path which is offset from the path of the incoming beam from the entrance slit to the mirror 23 by a distance corresponding to the distance between the mirror portions 26', 27'. For example, a beam $x$ from the entrance slit is diffracted into component beams $y$ and $z$. When the beam $y$ is reflected by the mirror 23 to strike the mirror 26 at the portion 26' of the mirror 26, it is returned to the mirror 23 by the portion 27' of the mirror 27 and will follow a path to the mirror 22 that is offset below its path to the mirror 23, while the component beam $z$ from the mirror 23 striking the corner mirror portion 27' will be redirected by the mirror 26 to the mirror 23 and will return to mirror 22 along a path offset above the original path for the beam z. Exit slit mirrors 32, 33 are disposed in the return paths of the beams from the portions 26', 27' on the entrance side of the reflecting mirror 20 to intercept the displaced beams from the corner mirror portions 26', 27' and to direct these beams onto exit slits 34, 41.

In operation, the corner mirror 26 of any set of corner mirrors first moves into the radiation reflected by the mirror 23, but radiation will not be returned through the instrument until the wheel 25 has revolved to where the corner mirror 27 is in position to redirect radiation from the mirror 26 to the mirror 23 and to receive incident radiation from the mirror 23 and reflect it to the mirror 26 to direct it in a return path through the instrument. Consequently, when the mirror 26 is in a position where radiation from the center of the spectral band will strike the portion 26' of the mirror 26, the mirror 27 is in a position where the radiation from the lower end of the band (shorter wavelength) strikes the portion 27' of the corner mirror 27 and as the wheel rotates, the corner mirror 26 will sequentially intercept the progressively longer wavelength spectral component beams in the longer wavelength portion of the band while the corner mirror 27 sequentially intercepts the progressively longer wavelength beams in the shorter wavelength portion of the band. Referring to FIG. 1, the corner mirror 26 will sequentially intercept those beams which strike the mirror 23 from the center of the mirror to the left while the corner mirror 27 at the same time is sequentially scanning the beams which strike the reflecting mirror 23 from the right to the center.

The corner mirrors may be mounted on a scanning wheel having, for example, a diameter of 12 inches and 24 pairs or sets of corner mirrors. The rotational speed may for example, be 24 to 2,400 revolutions per minute and in one embodiment the dispersed radiation may extend to about 50 millimeters from right to left at the focal plane 24 and the period of time for each scan by a pair of mirror members 26, 27 is from 100 milliseconds to 1 millisecond depending upon the rotational speed. The scanning wheel, as shown in FIG. 1, has a disproportionately small radius and a small number of corner mirrors for clarity of illustration but without intending to suggest that these proportions be adopted in actual practice.

During operation, the corner mirrors will tend to redirect radiation through the instrument in addition to that striking the portions 26', 27'. An apertured baffle 31 is located along the midplane of each set of corner mirrors. The aperture in this baffle has been designated by the numeral 31a and is of a size to allow the component spectral beams to be redirected through the instrument in sequence. In view of the fact that the movement of the corner mirrors is not precisely linear and that minor non-linearities may be present in the optical system, the aperture is preferably of a size larger than necessary to pass a single band of spectral radiation because it might otherwise block the redirection of the spectral beams. In practice, the apertured baffle may be sufficiently large to pass several spectral beams.

From the foregoing, it will be understood that the various wavelength components which were in the portion of the spectrum appearing at the focal plane 24 are reflected back to mirror 23 spaced apart in time according to the speed at which the corner mirror has scanned through the focal plane. These time-displaced different wavelength components are transmitted back through the optical system composed of the second collimator mirror 22, the grating 21 and the first collimator mirror 20. In this return pass of the radiant energy the grating 21 further disperses the radiant energy into its different wavelength components. After being dispersed the second time by the grating 21, the radiant energy is collimated by mirror 20, which causes the different wavelength components to be reflected along parallel paths (still displaced in time).

The pair of plane mirrors 32 and 33 are positioned on opposite sides laterally of the entrance slit 11 to intercept the return radiant energy reflected from mirror 20. Both of these mirrors 32, 33 are positioned at the same acute angle, preferably 45°, to the path of the return energy. Due to the symmetry of the corner mirror array on the scanning wheel 25, the shorter wavelength half of the scanned portion of the spectrum will return laterally displaced to one side of the entrance slit 11 so as to strike mirror 32, and the longer wavelength half will return laterally displaced to the opposite side of entrance slit 11 so as to strike mirror 33.

The shorter wavelength half of the scanned portion of the spectrum which is reflected from mirror 32 passes through a first exit slit 34 and filter 35 to a first photoelectric detector 36, which produces an electrical output signal whose instantaneous amplitude is proportional to the instantaneous intensity of the radiant energy which it receives. This output signal is amplified by an amplifier 36a and is applied via line 37 to a control circuit 38 and from there it is applied via line 39 to one set of vertical deflection plates in a dual-beam cathode ray oscilloscope 40.

The longer wavelength half of the scanned portion of the spectrum, which is reflected from mirror 33, passes through a second exit slit 41 and filter 42 to a second photoelectric detector 43, which produces an electrical output signal whose instantaneous amplitude is proportional to the instantaneous intensity of the radiant energy which it receives. This second output signal is amplified by an amplifier 43a and is applied via line 44 to control circuit 38 and from there via line 45 to a second set of vertical deflection plates in the dual-beam oscilloscope 40.

The horizontal sweep of each cathode ray beam in the oscilloscope 40 is initiated in response to the energization of a photoelectric detector 46, which is connected by a line 47 to the control circuit 38. Associated with this detector 46 is a light source 48 which directs a beam of light through a lens 49 to a stationary plane mirror 50, which presents a reflecting surface disposed at 45° to a radius R' of the scanning wheel passing through the corner 28 of the corner mirror 26, 27 immediately behind the corner mirror which is then scanning through the focal plane 24.

The arrangement is such that the light from this source 48 is reflected from the plane mirror 50 to one corner mirror member 26 through the apertured baffle 31 to the opposite mirror member 27 of the same pair, and from mirror member 27 back to mirror 50 and from the latter through a lens 51 to the detector 46 when the corner mirror set is at a position corresponding to a predetermined time interval before that same corner mirror will begin to scan through the focal plane 24. A suitable time delay means is provided in the control circuit 38 to delay the start of the horizontal sweep of the cathode ray beams until that same corner mirror will have moved into position to begin scanning the radiant energy spectrum in focal plane 24. This time delay is, of course, correlated with the constant rotational speed of the scanning wheel at that time. The time delay means may comprise one or more one shot multivibrators triggered by the photocell 46 to an unstable state and providing a signal to trigger the horizontal sweep when on return to a stable state. Preferably the speed of the scanning wheel and the time delay are adjustable in any known manner to provide scans at different rates. With this arrangement, therefore, the triggering of the horizontal sweep of the cathode ray beam will always occur so that at the instant when a set of corner mirrors is positioned to start their scan the position of each horizontal sweep will always begin at a particular wavelength on the scan. The mounting of the corner mirrors on the scanning wheel is not critical because the pulse which triggers the horizontal sweep will always occur at a fixed time interval after the detector 46 has been energized, and such energization of detector 46 will always take place in response to the actual position of a corner mirror even if the corner mirrors are not precisely spaced apart on the scanning wheel.

With the arrangement, for each scan by a particular corner mirror 26, 27 on the scanning wheel the cathode ray oscilloscope 40 displays a pair of traces 52, 53, representing radiation intensity vs. wavelength for the different parts of the spectral region detected by the respective detectors 36 and 43.

The control circuit 38 for the cathode ray oscilloscope 40 may include a vertical separation indexer which causes the traces produced in response to successive scans by the scanning wheel 25 to be vertically displaced on the face of the oscilloscope. These separate, vertically displaced traces may be identified by timing markers on a separate oscilloscope (not shown) which displays the total radiation from the source 10 over a period of time encompassing the successive scans. For this purpose, a detector 54, sensitive to the entire portion of the spectrum under consideration, may be positioned in the focal plane of the Cassegrainian optical system and this detector may be connected to this separate oscilloscope to display the total radiation pattern over this time period.

The signal from the detector 54 may also be applied to a coincidence gate means to which the time delayed signal from the synchronizing detector 46 is applied to initiate a scan when a phenomena is present.

It will be recognized, of course, that a dual-beam oscilloscope is only one of many data presentation devices that may be used with the apparatus of the present invention. For example, by pulse code modulation techniques, the signals from the detectors 36 and 43 could be digitized and recorded on magnetic tape for subsequent input to a computer. Or, if the scan rate were slow enough, the outputs could be fed to strip chart recorders. The particular data presentation device selected will depend upon the user's particular needs.

SLIT PROGRAMMING

Figure 3:
FIG. 3 is a fragmentary elevational view taken along the line 3—3 in FIG. 1 and illustrating the fixed baffle positioned near the scanning wheel in this instrument in accordance with the present invention.

In accordance with the present invention an opaque baffle H is fixedly positioned between the plane mirror 23 and the periphery of the scanning wheel 25, preferably as close as physically possible to the intermediate focal plane 24 so that the images will be only slightly out of focus at the baffle H. The baffle H may have a shape as indicated in FIG. 3, which is viewed from the line 3—3 in FIG. 1 in a plane extending perpendicular to the plane of FIG. 1. From FIG. 3 it will be evident that the opaque baffle H has a maximum height at the right in FIG. 1, which is the shorter wavelength end of the spectrum being scanned, and its height decreases in accordance with a predetermined pattern or profile to zero at the middle of the spectrum.

Figure 2:
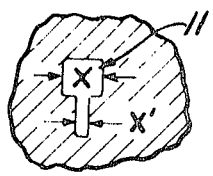
FIG. 2 is a fragmentary elevational view taken along the line 2—2 in FIG. 1 and illustrating the entrance slit in this instrument.

In this embodiment of the invention the entrance slit 11 of the monochromator has the shape indicated in FIG. 2, having a substantially greater width $x$ for its upper half than the width $x'$ of its lower half. In the particular embodiment shown, the upper half of the entrance slit is five times as wide as the lower half. When the full heights of both halves of this slit are observed, the wider top half contributes about 96 percent of the total observed energy since the energy is proportional to the square of the slit width.

Figure 5:
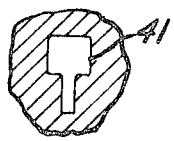
FIG. 5 is a fragmentary elevational view taken along the line 5—5 in FIG. 1 and illustrating the exit slit and its baffle for the longer wavelength portion of the spectrum.

As shown in FIG. 5, the exit slit 41 for the longer wavelength half ($\lambda_b$ to $\lambda_c$) of the spectrum being scanned has the same shape as that of the entrance slit 11, being substantially wider at its top half than at its bottom half.

Figure 4:
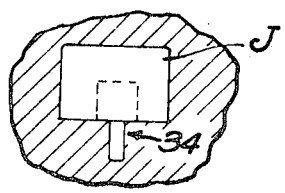
FIG. 4 is a fragmentary elevational view taken along the line 4—4 in FIG. 1 and illustrating the exit slit which passes the shorter wavelength portion of the spectrum scanned.

The opening provided by the exit slit 34 for the shorter wavelength half ($\lambda_a$ to $\lambda_b$) of the portion of the spectrum being scanned has a shape that is the same as the narrow lower half of entrance slit 11. For convenience of manufacture, as shown in FIG. 4, the exit slit 34 may have the same shape as that of the entrance slit, but have its wider top half completely blocked by an opaque baffle J, so that only the narrow bottom half of exit slit 34 can pass radiation.

Figure 6:
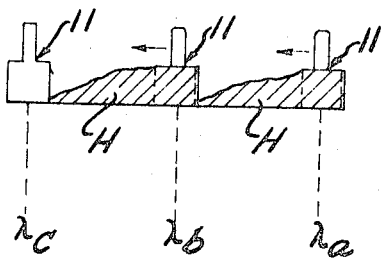
FIG. 6 is a schematic view showing the baffle near the scanning wheel superimposed over the entrance slit to illustrate the slit programming over both the shorter wavelength portion of the spectrum (from $\lambda_b$ to $\lambda_a$) and the longer wavelength portion of the spectrum (from $\lambda_c$ to $\lambda_b$)

Referring to FIG. 6, with the direction of scanning being from right to left, the wavelength $\lambda_a$ is the shortest wavelength in the spectrum being scanned and, as the scanning wheel 25 rotates counterclockwise in FIG. 1, the mirror member 27 will scan progressively from the shortest wavelength $\lambda_a$ over to a longer wavelength $\lambda_b$. At the same time the other mirror member 26 of the same corner mirror will scan from $\lambda_b$ over to the longest wavelength $\lambda_c$ in the portion of the spectrum being scanned. The radiation within the bandwidth from $\lambda_a$ to $\lambda_b$ which is intercepted by the mirror member 27 will be reflected from mirror member 26 of the same corner mirror to the exit slit 34, as already described. The radiation within the bandwidth from $\lambda_b$ to $\lambda_c$ which is intercepted by the mirror member 26 will be reflected from mirror member 27 of the same corner mirror to the exit slit 41.

From FIG. 6, which illustrates the baffle H superimposed over the entrance slit 11 (inverted), it will be evident that over the radiant energy bandwidth from $\lambda_b$ to $\lambda_c$ the baffle H will control the amount of energy passed to the exit slit 41 in accordance the the height profile of this baffle. At the wavelength $\lambda_b$, all of the energy which would otherwise pass through the wider half of the exit slit 41 is blocked by the baffle H, so that only the energy which will be directed to the narrower half of exit slit 41 will be unobstructed by baffle H. As the wavelength scan moves toward the higher wavelength $\lambda_c$ the profile of the baffle H is such that progressively more of the radiant energy will be passed through the wider half of the exit slit 41, until finally at wavelength $\lambda_c$ the baffle H does not obstruct any of the radiant energy coming in through the entrance slit of the monochromator.

The baffle H has the same effect on the scan from the shortest wavelength $\lambda_a$ over to $\lambda_b$ but, since the baffle J at the exit slit 34 blocks the wider upper half of this exit slit, the baffle H has no practical effect from $\lambda_a$ to $\lambda_b$. The exit slit 34 will pass all of the radiant energy received by its narrower bottom half only, which is not blocked by either the baffle H at the scanning wheel or the baffle J at this exit slit.

With this arrangement the fixedly-positioned baffle H over the bandwidth from $\lambda_b$ to $\lambda_c$ varies the effective height of the exit slit 41 in accordance with the energy wavelength. In addition, the shape of the exit slit 41 itself is such that it provides different slit widths at different heights. Therefore, the effective open area of the exit slit 41 (i.e., the area of slit 41 that will receive radiation from the scanning wheel 25 past the baffle H) may be varied with the wavelength so as to obtain the desired balance in the spectral scanning instrument among the resolution, the signal level and the background noise level. The narrower the effective area of the exit slit which can pass radiation, the greater will be the resolution, which is desirable where sufficient energy is available. Conversely, in those portions of the radiation spectrum where the available energy is lower, the signal level can be increased by providing a relatively large effective area of the exit slit which can pass radiation, due to the shape of the baffle H.

By choosing the widths of the entrance slit 11 and the exit slit 41 as a particular function of height, any desired slit-width programming as a function of wavelength can be obtained by adjusting the height contour of the baffle H. Repetitive scans of the bandwidth over which this baffle is effective will follow the same program without requiring any mechanical motion of these slits or this baffle. As shown in this embodiment, the width of the entrance slit 11 and the exit slit can have an abrupt, step-like change as a function of height, but still the effect of the baffle H will be such that the effective area of this exit slit will have the desired smooth or gradual variation with wavelength.

If desired, however, the entrance slit 11 and the exit slit 41 may have a width which varies gradually with height, instead of abruptly, as shown.

In the particular embodiment under discussion the other exit slit 34 is not programmed by the baffle H. Instead, because of its baffle J this exit slit has only its narrow bottom half exposed to radiation and, as indicated in FIG. 6, the baffle H does not, at any wavelength in the scan, intercept any of the radiant energy passing through the narrow half of the entrance slit 11 and which will pass to the narrow half of either exit slit. However, in practice, over the bandwidth from $\lambda_a$ to $\lambda_b$, which is the shorter wavelength portion of the spectrum being scanned, the available energy is assumed to be high enough that only the narrow half of the exit slit 34 may be used in order to improve the resolution, and that the dynamic range of the background signal will not be excessive nor will the signal-to-noise ratio be too low anywhere in the scan between $\lambda_a$ and $\lambda_b$.

Figure 10:
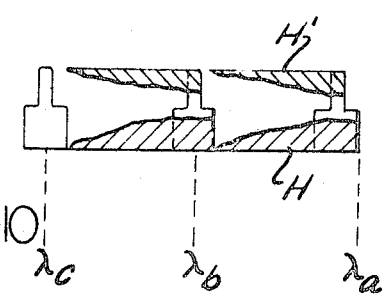
FIG. 10 is a view similar to FIG. 6 but showing a two-baffle arrangement near the scanning wheel.

If the dynamic range of the signal between $\lambda_a$ and $\lambda_b$ is excessive, an additional fixed baffle H' may be provided directly above the baffle H, as indicated in FIG. 10, so as to program the narrow half of the exit slit 34 as a function of wavelength.

Figure 11:
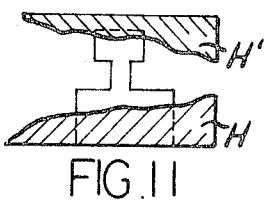
FIG. 11 is a view similar to FIG. 10, but with the exit slit for the longer wavelength portion of the spectrum modified.

Further flexibility may be provided by forming the slit with an intermediate width portion at the top as shown in FIG. 11 and programmable by baffle H'.

Since this additional baffle H' also affects the programming of the other exit slit 41, the lower baffle H may have a height profile such that it passes sufficient energy to the wider half of exit slit 41 to offset the effective area reduction of the narrower half of slit 41 which is provided by the upper baffle H', particularly in the vicinity of the wavelength $\lambda_b$.

Figure 7:
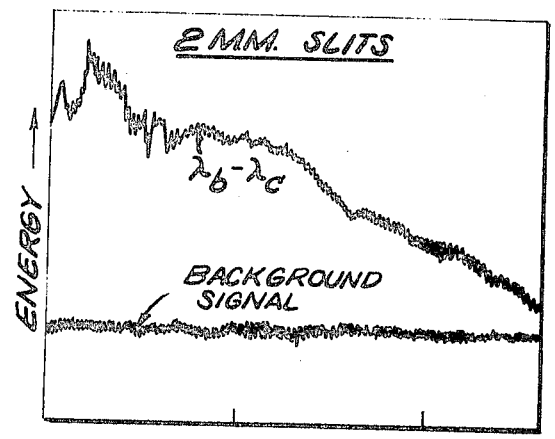
FIG. 7 shows the energy versus wavelength characteristics at the longer wavelength exit slit of the FIG. 1 instrument with the baffle near the scanning wheel omitted and with the entrance slit and this exit slit both having a uniform width of 0.2 mm. for their complete height.
Figure 8:
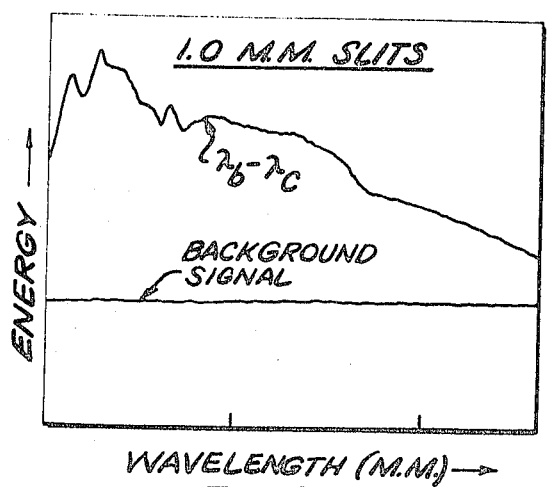
FIG. 8 is a view similar to FIG. 7 for a uniform slit width of 1.0 mm. for the complete height of both the entrance slit and the longer wavelength exit slit.
Figure 9:
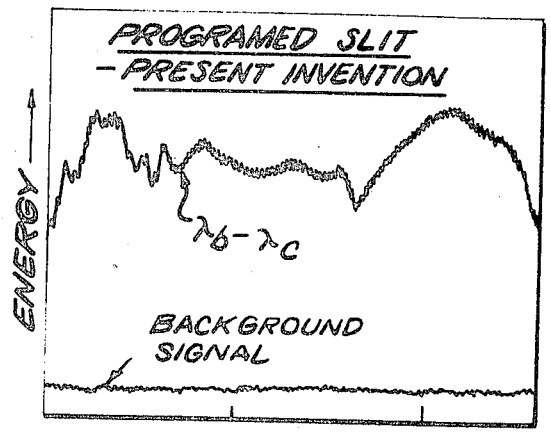
FIG. 9 shows the energy versus wavelength characteristics at the longer wavelength exit slit of the FIG. 1 instrument where a baffle as shown in FIG. 3 is provided near the scanning wheel and both the entrance slit and this exit slit are shaped as shown in FIGS. 2, 4 and 5.

FIGS. 7–9 illustrate the effect of the baffle H and the particular shape of the exit and entrance slits as shown in FIGS. 2–5, where the sample 10 is HCl in a quartz cell which receives radiation from a lamp and the portion from $\lambda_b$ to $\lambda_c$ of the spectrum scanned is from 1.7 to 2.4 $\mu$m.

The upper curve in FIG. 7 shows the $\lambda_b$ to $\lambda_c$ portion of the spectrum observed where the entrance slit 11 and the exit slit 41 were 0.2 mm. wide for their entire height (there being no baffle H present at the scanning wheel 25). The lower curve in FIG. 7 shows the background signal level over this same portion of the spectrum. Under these circumstances, while the resolution is good, the signal-to-noise ratio is poor at the long wavelength ($\lambda_c$) end of this portion of the spectrum, and the dynamic range of the background signal over this portion of the spectrum is undesirably large.

The upper curve in FIG. 8 shows this same portion of the spectrum observed where the entrance slit 11 and the exit slit 41 were both 1.0 mm. wide for their entire height (again there being no baffle H present at the scanning wheel 25). Under these circumstances the signal-to-noise ratio is high throughout the spectrum, but the dynamic range of the background signal over the spectrum is undesirably high, the rotational lines of the 1.8 $\mu$m HCl band are not clearly resolved, and decreased resolution is apparent in the 1.9 $\mu$m atmospheric H$_2$O band.

The upper curve in FIG. 9 shows the same portion of the spectrum observed where the entrance slit 11 and the exit slit 41 were both contoured as shown in FIGS. 2, 4 and 5, being 1.0 mm. wide at the top half and 0.2 mm. wide at the bottom half, and with the baffle H of FIG. 3 positioned near the scanning wheel, as shown in FIG. 1. Baffle H blocked most of the energy from the wider top half of the entrance slit at the shorter wavelength end of this portion of the scan, where the signal from the sample 10 was strong. Therefore, the HCl rotational lines near 1.8 $\mu$m which are resolved by the narrow bottom halves of the entrance slit 11 and the exit slit 41, are a prominent feature of the spectrum. Because of its contour, the baffle H blocks less of the energy toward the longer wavelengths where less energy is available. Consequently, a good signal-to-noise ratio is maintained throughout this portion of the spectrum. Also, the dynamic range of the background signal is comparatively small.

From the foregoing description it will be apparent that the present slit programming arrangement enables the user to achieve the desired balance among resolution, signal-to-noise ratio, and background signal dynamic range throughout the radiant energy spectrum being scanned without requiring any moving parts for slit programming, and that the present slit programming arrangement is particularly advantageous for use in a spectral analysis instrument as shown. However, while presently-preferred embodiments of this invention have been disclosed, it is to be understood that various modifications, omissions and adaptations which depart from the disclosed embodiments may be adopted without departing from the spirit and scope of the present invention.

We claim:

1. A spectral analysis instrument comprising means for collecting radiant energy from a source thereof, means for dispersing the collected radiant energy into components of different wavelengths which have associated therewith different quantities of radiant energy, means for focusing the components of different wavelengths at different locations on an intermediate focal plane, first exit slit means having a first cross sectional area through which a first series of the components of different wavelengths having a relatively low quantity of radiant energy associated therewith pass to a first receiver, second exit slit means having a second cross sectional area through which a second series of the components of different wavelengths having a relatively high quantity of radiant energy associated therewith pass to a second receiver, said first cross sectional area being greater than said second cross sectional area to facilitate the passage of radiant energy through said first exit slit means to said first receiver with said first series of components of different wavelengths and to at least partially block the passage of said radiant energy through said second exit slit means to said second receiver with the second series of components of different wavelengths, optical means for directing the first series of components of different wavelengths away from said intermediate focal plane toward said first exit slit means along outgoing paths which are substantially coincident for at least a portion of their lengths with incoming paths along which said second series of components of different wavelengths travel toward said intermediate focal plane and for directing the second series of components of different wavelengths away from said intermediate focal plane toward said second exit slit means along outgoing paths which are substantially coincident for at least a portion of their lengths with incoming paths along which said first series of components of different wavelengths travel toward said intermediate focal plane, and stationary baffle means positioned close to said intermediate focal plane in the incoming paths of at least a portion of one of said series of components of different wavelengths and the outgoing paths of at least a portion of the other of said series of components of different wavelengths to intercept predetermined amounts of the radiant energy associated with at least a portion of the first series of components of different wavelengths to thereby at least partially control the radiant energy transmitted through the relatively large cross sectional area of said first exit slit means to said first receiver.

2. A spectral analysis instrument as set forth in claim 1 wherein said optical means includes first and second mirror means mounted in a predetermined angular relationship with each other and means for moving said first and second mirror means simultaneously across different portions of said intermediate focal plane, said first mirror means being positioned as it moves across said intermediate focal plane to receive each of the components of different wavelengths of said second series in turn and to sequentially reflect them to said second mirror means and to receive from said second mirror means each of said components of different wavelength of said first series in turn and to sequentially reflect them toward said first exit slit means, said second mirror means being positioned as it moves across said intermediate focal plane to receive each of the components of different wavelengths of said first series in turn and to sequentially reflect them to said first mirror means and to receive from said first mirror means each of said components of different wavelengths of said second series in turn and to sequentially reflect them toward said second exit slit means.

3. A spectral analysis instrument as set forth in claim 2 wherein said stationary baffle means is positioned to intercept at least a portion of the radiant energy associated with said first series of components of different wavelengths after they have been reflected by said first mirror means toward said first exit slit means.

4. A spectral analysis instrument as set forth in claim 1 wherein said first series of components of different wavelengths are focused on a first portion of said intermediate focal plane and said second series of components of different wavelengths are focused on a second portion of said intermediate focal plane.

5. A spectral analysis instrument as set forth in claim 1 wherein each of said exit slit means has a predetermined height, and said baffle means has a height contour such that it blocks the return energy from corresponding portions in the height of each of said exit slit means in a manner depending upon the wavelength being instantaneously scanned by said optical means.

6. A spectral analysis instrument as in claim 5 wherein said exit slit means has a width which is different at different heights thereof.

7. A spectral analysis instrument as in claim 6 wherein the baffle height is adjusted relative to the slit width so that the available energy passed by the baffle and through the slit is held roughly constant while the resolution of the instrument is varied to maintain the energy at said roughly constant level.

* * * * *